United States Patent
Harries et al.

(10) Patent No.: US 12,492,667 B2
(45) Date of Patent: Dec. 9, 2025

(54) CYLINDER HEAD JOINT GAS LEAKAGE MITIGATION

(71) Applicant: Cummins Power Generation Limited, London (GB)

(72) Inventors: Robert Harries, London (GB); Simon Anthony Burge, Rugby (GB)

(73) Assignee: Cummins Power Generation Limited, London (GB)

( * ) Notice: Subject to any disclaimer, the term of this patent is extended or adjusted under 35 U.S.C. 154(b) by 0 days.

(21) Appl. No.: 18/283,743

(22) PCT Filed: Mar. 22, 2022

(86) PCT No.: PCT/IB2022/052626
§ 371 (c)(1),
(2) Date: Sep. 22, 2023

(87) PCT Pub. No.: WO2022/201039
PCT Pub. Date: Sep. 29, 2022

(65) Prior Publication Data
US 2024/0175405 A1 May 30, 2024

(30) Foreign Application Priority Data
Mar. 23, 2021 (GB) .................................... 2104002

(51) Int. Cl.
*F02F 1/24* (2006.01)
*F02F 1/00* (2006.01)
(Continued)

(52) U.S. Cl.
CPC ................ *F02F 1/24* (2013.01); *F02F 1/004* (2013.01); *F02F 11/002* (2013.01); *F16J 15/0818* (2013.01); *F16J 15/10* (2013.01)

(58) Field of Classification Search
CPC .. F02F 1/24; F02F 1/004; F02F 11/002; F02F 11/005; F16J 15/0818; F16J 15/10; F16J 15/02
See application file for complete search history.

(56) References Cited

U.S. PATENT DOCUMENTS

| 2,972,341 A | 2/1961 | Forst |
| 4,213,620 A | 7/1980 | Kennedy et al. |
| (Continued) | | |

FOREIGN PATENT DOCUMENTS

| BR | 1020181002165 | 10/2018 |
| CH | 368968 A | 4/1963 |
| (Continued) | | |

OTHER PUBLICATIONS

Machine translation, DE3242526A1, Maus et al., published May 30, 1984, obtained from https://worldwide.espacenet.com/, pp. 1-5.*

(Continued)

*Primary Examiner* — Grant Moubry
(74) *Attorney, Agent, or Firm* — Foley & Lardner LLP

(57) ABSTRACT

An internal combustion engine system includes a cylinder block, a plurality of bite rings, a cylinder head, and a head gasket. The cylinder block defines a combustion cylinder. The plurality of bite rings encompass the cylinder. The cylinder head is coupled to the cylinder block and covers the combustion cylinder. The head gasket is disposed between the cylinder head and the cylinder block and is structured to engage with the plurality of bite rings. The cylinder head may further include an expansion groove that is disposed between adjacent ones of the plurality of bite rings and extends in a circumferential direction around the cylinder head.

10 Claims, 15 Drawing Sheets

(51) Int. Cl.
*F02F 11/00* (2006.01)
*F16J 15/08* (2006.01)
*F16J 15/10* (2006.01)

(56) References Cited

U.S. PATENT DOCUMENTS

| | | |
|---|---|---|
| 4,331,336 A | 5/1982 | Czernik et al. |
| 4,462,615 A | 7/1984 | Ulmer et al. |
| 5,551,382 A | 9/1996 | Bauer et al. |
| 6,036,194 A | 3/2000 | Stamper |
| 6,196,179 B1 * | 3/2001 | Frantzheld .............. F02F 11/002 277/653 |
| 7,520,257 B2 | 4/2009 | Adams et al. |
| 9,856,823 B2 | 1/2018 | Chittenden |
| 2005/0023768 A1 | 2/2005 | Adams et al. |
| 2005/0206091 A1 | 9/2005 | Detmann et al. |
| 2007/0170661 A1 * | 7/2007 | Mancenido .............. F16J 15/08 277/600 |
| 2018/0230938 A1 | 8/2018 | Berner et al. |
| 2022/0243816 A1 * | 8/2022 | Langtry .................. F16J 15/46 |

FOREIGN PATENT DOCUMENTS

| | | |
|---|---|---|
| CN | 103912402 | 7/2014 |
| DE | 13604 A | 8/1957 |
| DE | 3242526 A * | 5/1984 ............. F16J 15/123 |
| DE | 37 27 598 | 3/1989 |
| DE | 10256896 | 7/2004 |
| DE | 10331615 | 2/2005 |
| DE | 10 2007 026 476 A1 | 12/2008 |
| DE | 10 2016 002 157 | 8/2016 |
| EP | 3 361 080 | 8/2018 |
| GB | 0 495 556 | 11/1938 |
| GB | 0 885 068 | 12/1961 |
| JP | 2006-037737 A | 2/2006 |

OTHER PUBLICATIONS

International Search Report and Written Opinion on PCT PCT/IB2022/052626 Dtd Oct. 25, 2022 (15 pages).
International Search Report and Written Opinion on PCT PCT/IB2022/052626 Dtd Aug. 4, 2022 (16 pages).
Search Report on GB 2104002.7 DTD Jul. 1, 2021 (4 pages).
Combined Search and Examination Report for GB Application No. 2404234.3, dated Apr. 4. 2024, 9 pgs.
Official Communication in GB 2104002.7 dated Mar. 11, 2024 (2 pages).
Search and Examination Report in GB 2404234.3 dated Mar. 26, 2025 (4 pages).
Letter regarding Details of Grant in GB 2404234.3 dated Jun. 29, 2025 (2 pages).

* cited by examiner

CYLINDER HEAD JOINT GAS LEAKAGE MITIGATION

CROSS REFERENCE TO RELATED APPLICATIONS

The present application claims priority to United Kingdom Patent Application 2104002.7 filed Mar. 23, 2021, the entire contents of which are incorporated herein by reference.

TECHNICAL FIELD

The present disclosure relates generally to cylinder head gaskets and cylinder head-cylinder block interface designs for internal combustion engine systems.

BACKGROUND

Internal combustion engine systems include a cylinder head and a cylinder block. The cylinder head covers the top of at least one combustion cylinder of the cylinder block and includes valves to control the flow of air or air/fuel mixture into and combustion gasses out of the combustion cylinder. The cylinder head may also include fuel injectors to control the introduction of fuel into the cylinder during engine operation. In order to seal the cylinder head to the cylinder block, engines systems may include a head gasket that extends along an interface surface between the cylinder head and the cylinder block assembly, which may include at least one cylinder liner.

SUMMARY

One embodiment of the present disclosure relates to an internal combustion engine system that includes a cylinder block, a plurality of bite rings, a cylinder head, and a head gasket. The cylinder block defines a combustion cylinder. The plurality of bite rings encompass the cylinder. The cylinder head is coupled to the cylinder block and covers the combustion cylinder. The head gasket is disposed between the cylinder head and the cylinder block and is configured to engage with the plurality of bite rings.

In some embodiments, the internal combustion engine system includes an expansion groove that is disposed in a lower surface of the cylinder head and extends in a circumferential direction around the cylinder head. The cylinder head may define a first vent passage that extends between the expansion groove and a second vent passage in the cylinder head that is fluidly connected to an outside environment. For example, the first vent passage may be coupled to an exhaust port in the cylinder head.

In some embodiments, the engine system includes a liner disposed at least partially within the combustion cylinder, and a channel disposed in the liner that extends between an upper side and a lower side of the liner. For example, the channel may be structured to direct leaked combustion gases from the upper side of the liner to a low pressure region of the combustion cylinder, to a space below a piston of the internal combustion engine system.

Another embodiment of the present disclosure relates to an internal combustion engine that includes a cylinder block and a cylinder head. The cylinder block defines a combustion cylinder. The cylinder head is coupled to the cylinder block and covers the combustion cylinder. The cylinder head includes an extension and a sealing ring disposed on the extension and structured to engage with an inner surface of the combustion cylinder.

Yet another embodiment of the present disclosure relates to an internal combustion engine that includes a cylinder block, a liner, and a cylinder head. The cylinder block defines a combustion cylinder. The liner is disposed at least partially within the combustion cylinder. The cylinder head is coupled to the cylinder block and covers the combustion cylinder. The cylinder head extends axially into the liner. The cylinder head includes a sealing ring disposed on the cylinder head that is structured to engage with an inner surface of the liner.

Yet another embodiment of the present disclosure relates to an internal combustion engine system that includes a cylinder block, a bite ring, a cylinder head, and a head gasket. The cylinder block defines a combustion cylinder. The bite ring encompasses the combustion cylinder. The cylinder head is coupled to the cylinder block and covers the combustion cylinder. The head gasket is disposed between the cylinder head and the cylinder block and is structured to engage with the bite ring. At least one of the cylinder head or the head gasket includes a first groove that encompasses the bite ring, and a second groove or plurality of grooves extending radially away from the first groove to an outer edge of the head gasket.

It should be appreciated that all combinations of the foregoing concepts and additional concepts discussed in greater detail below are contemplated as being part of the subject matter disclosed herein. In particular, all combinations of claimed subject matter appended at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
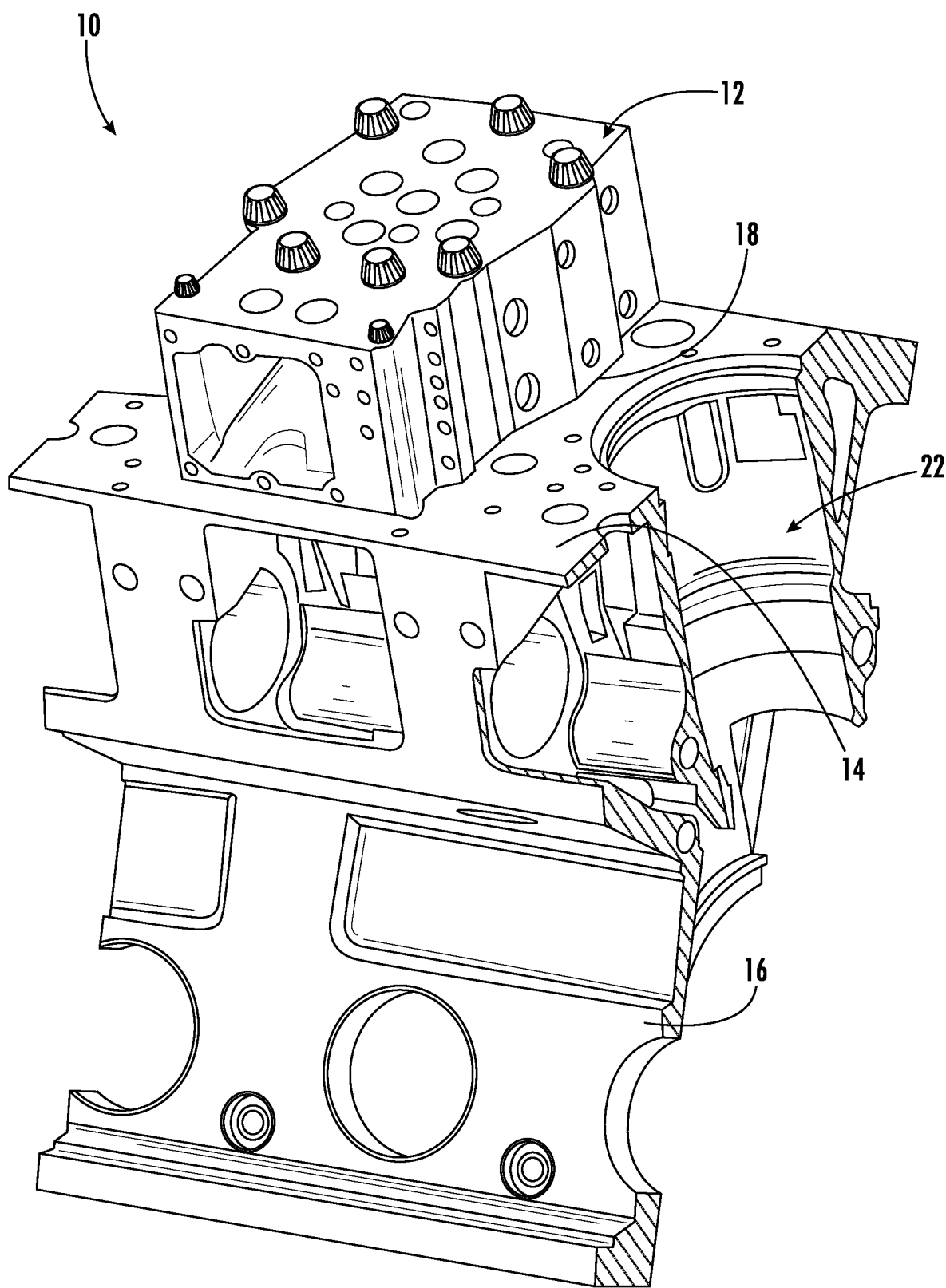
FIG. 1 is a partial perspective view of a cylinder head joint arrangement of an internal combustion engine system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to methods and devices for preventing combustion gas leakage from internal combustion engine systems and mitigation of damage to components of the engine systems in the event of gas leakage. In particular, embodiments described herein relate generally to cylinder head joint arrangements for internal combustion engine systems.

Various internal combustion engine systems include a cylinder block assembly, which may include cylinder liners defining a plurality of combustion cylinders (e.g., chambers, etc.), and a cylinder head affixed to the cylinder block. A clamp load between the cylinder head and the cylinder block assembly compresses the head gasket to prevent leakage of high temperature combustion gasses from the combustion cylinder and to reduce the risk of damage to neighboring components, including seals for portions where fluid (e.g., oil or coolant) is present. In some embodiments, as shown in FIG. 1, the engine system 10 includes a plurality of cylinder heads 12 each paired with and covering a respective one of the combustion cylinders. Each cylinder head 12 is disposed on an outer surface 14 (e.g., sealing surface, sealing interface, etc.) of the cylinder block 16, and covers a portion of the outer surface 14. As shown in FIG. 1, the engine system 10 also includes a head gasket 18 that is "sandwiched" or otherwise disposed between the cylinder head 12 and the cylinder block 16 to prevent leakage of exhaust gasses from the combustion cylinder.

Figure 2:
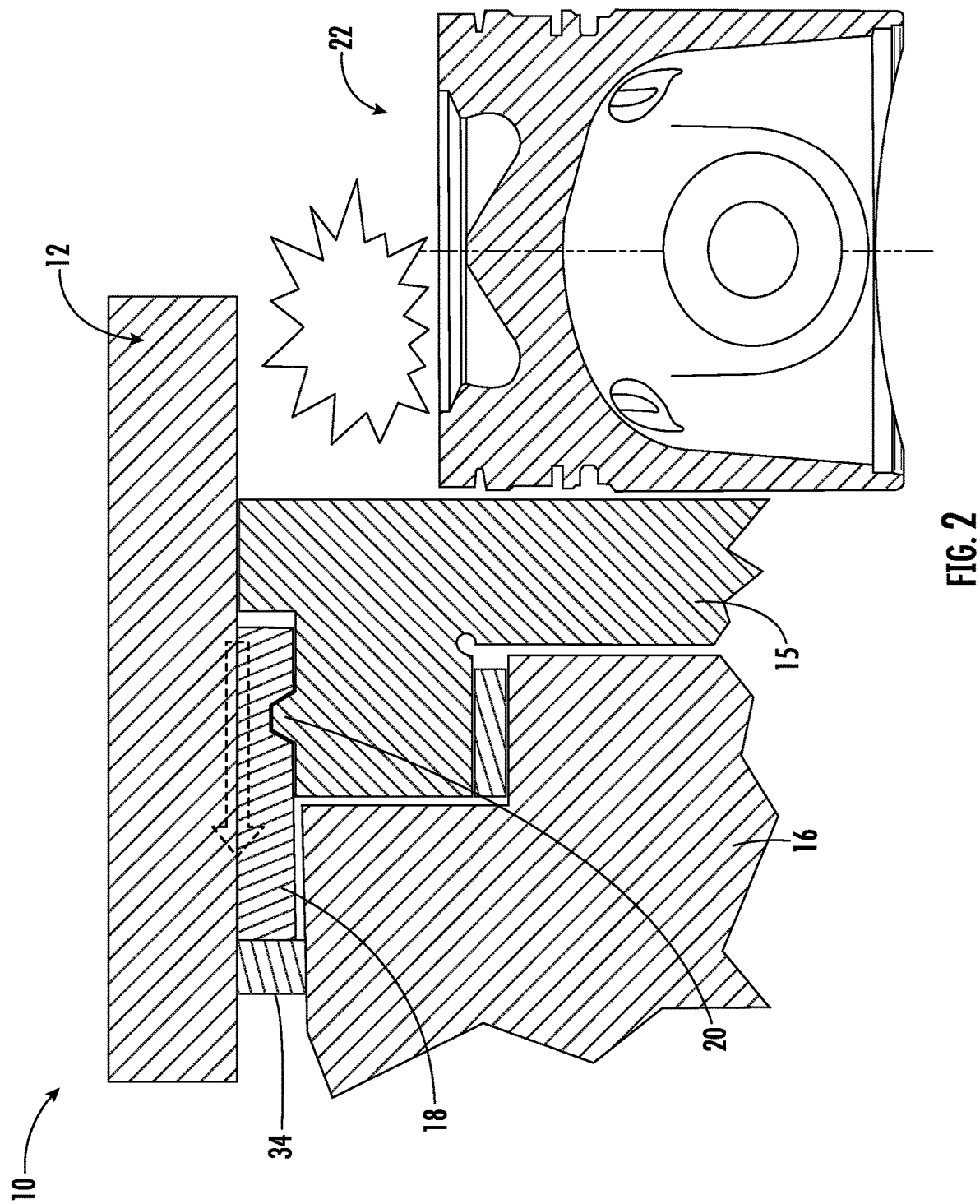
FIG. 2 is a side cross-sectional view of a cylinder head joint arrangement for an internal combustion engine system, according to an embodiment.

As shown in FIG. 2, the engine system 10 includes a cylinder liner 15, on which a bite ring 20 (e.g., axial projection, etc.) is located that engages the head gasket 18 under compression to improve sealing between the head gasket 18 and the cylinder head 12. The performance of the seal provided by the head gasket 18 at the bite ring 20 depends, among other factors, the amount of compression between the cylinder head 12 and the cylinder block 16, the amount of protrusion of the cylinder liner 15 above the cylinder block face (an upper surface of the cylinder block as shown in FIG. 1), the thickness of the head gasket 18, the stiffness of the cylinder head 12 and cylinder block 16, machining tolerances of mating surfaces of the cylinder head 12 and the cylinder block 16, and the temperature difference between the cylinder head 12 and the cylinder block 16 during engine operation, which can cause warping of the sealing surfaces of the individual cylinder heads 12. Under certain operating conditions, the pressure of the exhaust gasses within combustion cylinder may exceed the maximum allowable fluid pressure that can be contained by the compression seal formed by head gasket 18. This issue is particularly problematic in high horsepower diesel and natural gas engine systems that operate at high peak combustion pressures. In these instances, high temperature exhaust gasses can bypass the seal at the bite ring 20 and damage sensitive components, such as cylinder head gasket grommets that prevent leakage from the coolant and oil passages through the head gasket 18. Damage to the grommets can result in cross-contamination between the oil and coolant flows, leading to reduced engine performance and reduced overall operating life of the engine system 10, and may necessitate additional maintenance efforts.

The cylinder head joint structure of the present disclosure mitigates the aforementioned issues. In particular, various exemplary embodiments improve the strength of the seal between the cylinder head and the cylinder block assembly. Further, various embodiments provide for controlling the flow of combustion gasses in the event of a leak past the gasket seal at the interface between the cylinder head and the cylinder block assembly. In one embodiment, the cylinder liner includes multiple bite rings disposed on the cylinder liner and engaging the head gasket. During engine operation, the flow of combustion gas is substantially restricted past the innermost bite ring. The pressure and flow rate of any bypassed combustion gas continues to decrease along the flow path between the innermost bite ring and the radial space between adjacent bite rings, which increases the integrity of the compression seal at the outermost bite ring. In one embodiment, the cylinder head and/or gasket further defines an expansion groove between adjacent bite rings. The expansion groove provides an enclosed volume for any leaking combustion gasses to expand, which further reduces the fluid pressure at the outermost bite ring.

In at least one embodiment, combustion gases entering the expansion groove are vented directly to atmosphere or through the cylinder head to an exhaust port to reduce the fluid pressure acting on the outermost bite ring. In yet another embodiment, the geometry of the cylinder head and cylinder liner (upstream of the cylinder head gasket) may be designed to reduce combustion gas pressure acting on the head gasket. For example, the cylinder head may define a recessed channel that encompasses (e.g., circumferentially surrounds, circumscribes, etc.) the combustion cylinder and that receives at least a portion of the liner dam therein to increase flow restriction between the cylinder liner and the cylinder head. Additionally, the cylinder head may include a sealing ring disposed within the recessed channel and engaging the liner (e.g., a liner bore, an internal diameter of the liner, etc.) to thereby prevent exhaust gas leakage through the flow path between the cylinder head and the liner. In some embodiments, the cylinder head may also include a passage downstream of the sealing ring, between the sealing ring and the head gasket, to vent the combustion gas into the exhaust port of the cylinder head.

In yet another embodiment, the cylinder head and/or head gasket may be modified to direct any leaking combustion gas to an environment surrounding the engine system and away from any sensitive engine system components. For example, at least one of the cylinder head or the head gasket may define a plurality of flow directing grooves, including a first groove that encompasses (e.g., circumferentially surrounds, circumscribes, etc.) the bite ring, and a second groove that extends radially away from the first groove and the combustion cylinder to an outer edge of the head gasket. Among other benefits, reducing and/or controlling the flow of escaping combustion gasses through the head gasket reduces the risk of damage to sensitive coolant/oil grommets in the cylinder head gasket. Moreover, these structures can be retrofitted onto an existing engine system without modifying or replacing the original equipment cylinder block or altering engine performance.

The various concepts introduced above and discussed in greater detail below may be implemented in any of numerous ways, as the described concepts are not limited to any particular manner of implementation. Examples of specific implementations and applications are provided primarily for illustrative purposes.

Various numerical values herein are provided for reference purposes only. Unless otherwise indicated, all numbers expressing quantities of properties, parameters, conditions, and so forth, used in the specification and claims are to be understood as being modified in all instances by the term "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "approximately" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Returning to FIG. 1, the engine system 10 includes a cylinder block having cylinders arranged in pairs on either side of the cylinder block 16. In other embodiments, the arrangement of cylinders may be different. The engine may be a diesel engine, a gasoline engine, a natural gas engine, a dual fuel engine, a biodiesel engine, an E85 engine, a flex fuel engine, a gas turbine, or another type of internal combustion engine or driver. The engine may be used to power an electric power generator (e.g., genset, etc.) used to produce electricity (e.g., power), an alternator, or the like. In another embodiment, the engine system may be used to power a truck, a boat, a locomotive, or another type of vehicle (e.g., an on-road or off-road vehicle). In yet another embodiment, the engine system may be used in an industrial application to drive a pump, hydraulic system, or another type of system.

As shown in FIGS. 1-2, the engine system 10 includes a plurality of cylinder heads 12 and a corresponding plurality of head gaskets 18. Each cylinder head 12 and head gasket 18 is paired with a respective one of the cylinders 22 in the cylinder block 16. In other embodiments, a single cylinder head and/or head gasket may cover multiple cylinders in the cylinder block 16. As shown in FIG. 1, each cylinder head 12 is coupled to the outer surface 14 of the cylinder block 16 via a plurality of bolts or another suitable fastener. Each head gasket 18 is disposed between a respective one of the cylinder heads 12 and the cylinder block 16. In another embodiment, each head gasket 18 is disposed between a respective one of the cylinder heads 12 and the assembly of the cylinder block 16 and the cylinder liner 15. It will be appreciated that the cylinder head joint arrangement may be different in various embodiments, and that the cylinder head joint arrangement may include any combination of, but not limited to or exclusive of, a cylinder head, a head gasket, a cylinder liner, and a cylinder block. The bolts apply a clamp load (e.g., compression load) through the cylinder head 12 to the head gasket 18 to prevent movement of the head gasket 18 and to facilitate sealing between the head gasket 18, the cylinder head 12, and the cylinder block 16. In another embodiment, the bolts apply a clamp load (e.g., compression load) through the cylinder head 12 to the head gasket 18 to prevent movement of the head gasket 18 and to facilitate sealing between the head gasket 18, the cylinder head 12 and the assembly of the cylinder block 16 and the cylinder liner 15.

Figure 3:
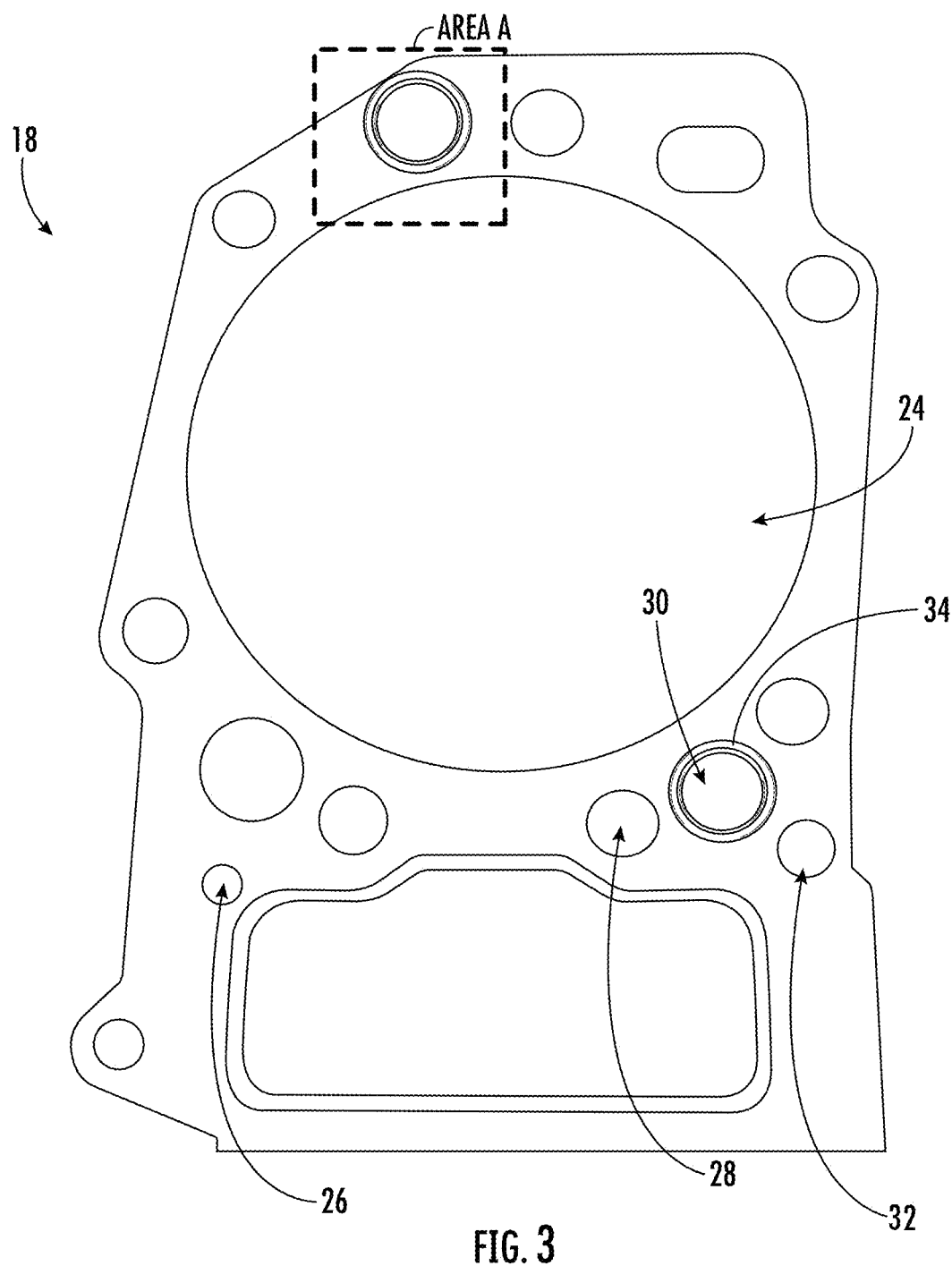
FIG. 3 is a top view of a head gasket for the engine system of FIG. 1.
Figure 4:
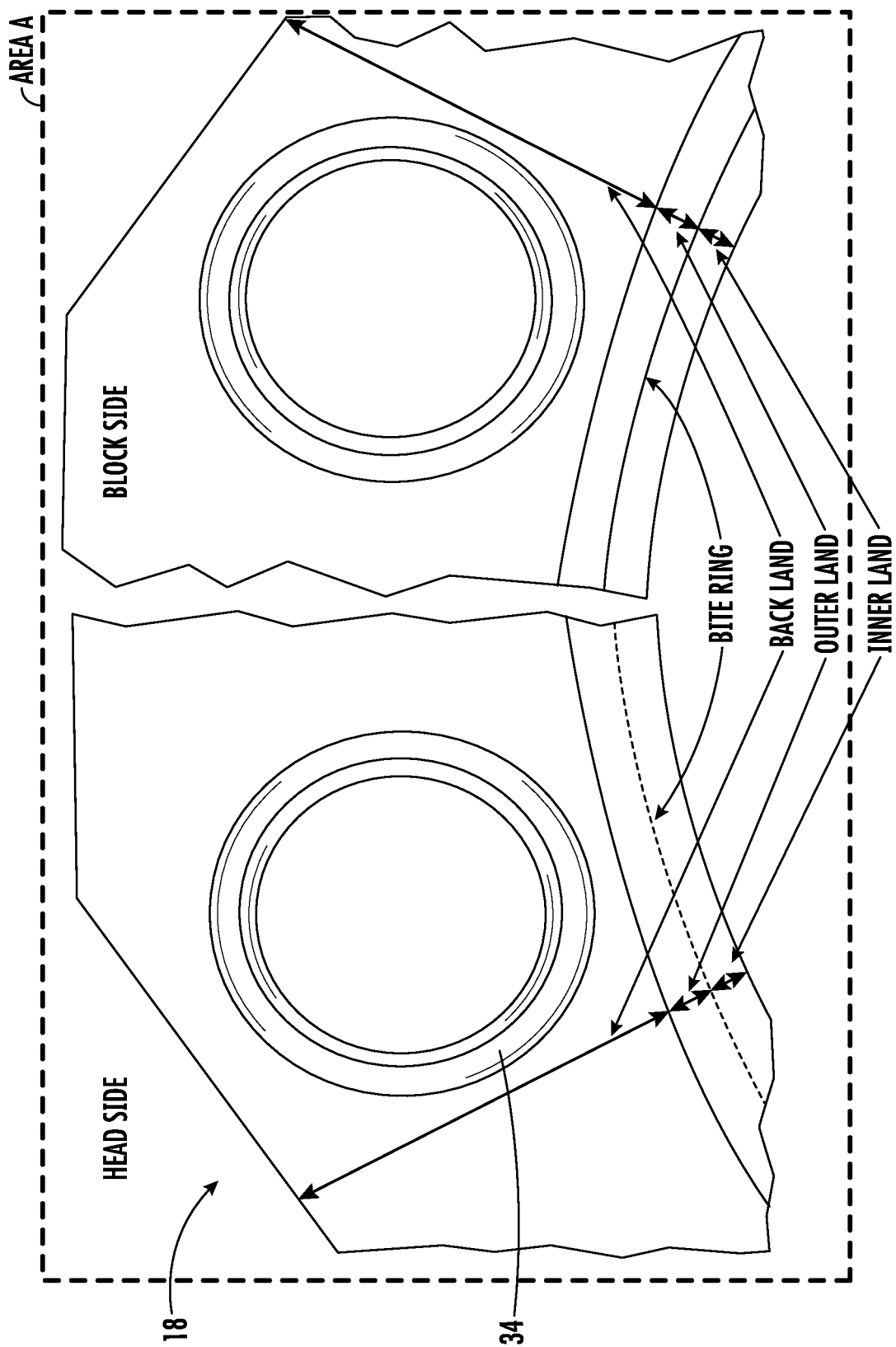
FIG. 4 is a partial perspective view of the head gasket of FIG. 3.

As shown in FIGS. 3-4, the head gasket 18 includes a plurality of openings including (i) a cylinder opening 24 that allows air, an air/fuel mixture, and combustion gasses to pass between the combustion cylinder and cylinder head 12; (ii) dowel and/or guide openings 26 that accept dowels and/or other positioning members to facilitate alignment between the cylinder block 16, cylinder head 12, and head gasket 18; (iii) bolt openings 28 that provide clearance for fasteners used to secure the cylinder head 12 to the cylinder block 16; (iv) coolant openings 30 that allow passage of coolant between the cylinder block 16 and the cylinder head 12; and (v) oil openings 32 that allow passage of oil between the cylinder block 16 and the cylinder head 12. It will be appreciated that the size, number, and arrangement of openings may be different in various embodiments. As shown in FIG. 4, the head gasket 18 also includes grommets 34 and/or other seal members (e.g., oil/coolant seals, O-rings, etc.) that engage with the cylinder head 12 and/or cylinder block 16 to prevent fluid leakage from the coolant openings 30 and oil openings 32 (see also FIG. 2). The head gasket 18 may be a plate gasket that is formed from a single sheet of material (e.g., steel, etc.), a multi-layer steel gasket, a non-metallic gasket, or another type of gasket.

Figure 5:
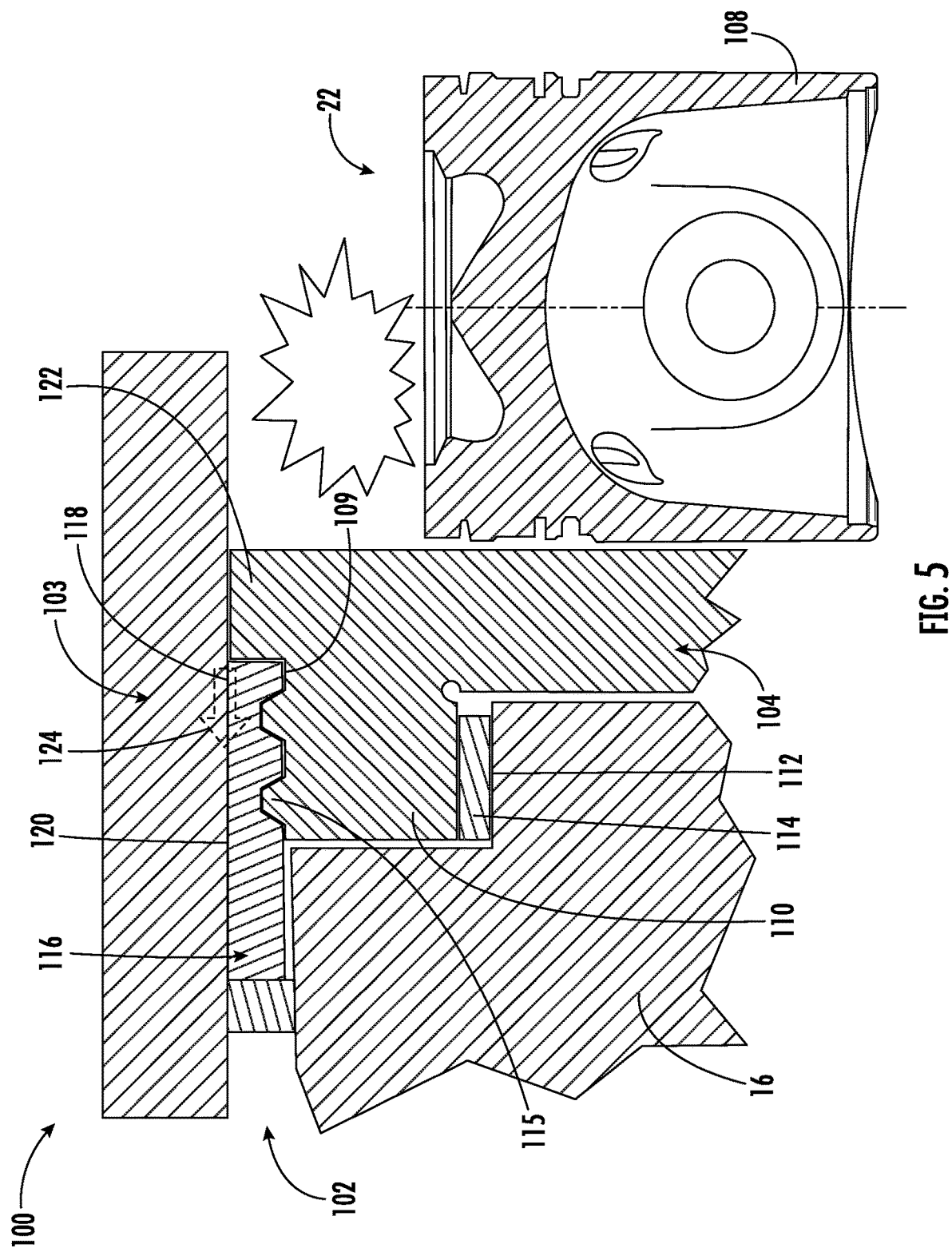
FIG. 5 is a side cross-sectional view of a cylinder head joint arrangement with multiple bite rings, according to an embodiment.

Referring now to FIG. 5, a first example cylinder head joint arrangement 102 for an internal combustion engine system 100 is shown. The engine system 100 includes a cylindrical liner, shown as liner 104 disposed at least partially within the cylinder 22 of the cylinder block 16. The liner 104 guides movement of an engine piston 108 along an axial direction within the cylinder 22. The liner 104 includes a circumferential flange, shown as flange 110 disposed at an upper axial end of the liner 104 and extending radially away from the cylinder 22. As shown in FIG. 4, the flange 110 engages with a generally "L" shaped counterbore ledge 112 at the top of the cylinder 22, which sets an axial position of the liner 104 within the cylinder 22. In some embodiments, the engine system 100 further includes a shim 114 (e.g., a cylindrically-shaped spacer, etc.) disposed on an upper surface of the ledge 112, which controls the axial position of the liner 104 so that an upper surface of the flange 110 is approximately flush with the outer surface 14 of the cylinder block 16, or so that the liner 104 is disposed at another suitable axial position within the cylinder 22. It will be appreciated that the design concepts and principles of the present disclosure are not limited to a single engine system type or configuration. For example, in other embodiments, the design of the liner and the arrangement of the liner within the bore may be different from that described with reference to the various embodiments herein. For example, the combustion cylinder may be formed into the cylinder block without the need for a cylinder liner (e.g., a parent bore). In some embodiment, the liner may be structured as a wet liner that creates at least a portion of an inner wall of the coolant passage and seals the coolant from the cylinder bore, or a dry liner that is not exposed to the coolant flow. In another embodiment, the liner may be engaged with the cylinder block in a mid-stop arrangement where the flange engages the cylinder block at an intermediate position that is between opposing ends of the bore in the cylinder block. In yet another embodiment, the liner may be engaged with the cylinder block in a deck stop arrangement where the flange seats on top of the cylinder block, or in a bottom-stop arrangement, and/or any other liner-block arrangement. In the case of a mid-stop or bottom stop liner arrangement, the bite rings may be disposed on the head gasket rather than the liner, and/or machined into one of the cylinder block upper surface or cylinder head. The cylinder head joint arrangement may also be different in various embodiments. For example, the cylinder head joint arrangement may include a sealing ring (e.g., a steel ring with armor to seal the combustion gas) that is separate from or integrally formed with the head gasket. In other embodiments, the liner flange may protrude upwardly from the block to increase the overall load on the head gasket at the liner (e.g., the liner protrusion holds and seals the head gasket). In yet other embodiments, the cylinder head joint arrangement employs a combination of sealing methods and/or pressure sealing arrangements.

As shown in FIG. 5, the flange 110 defines a plurality of bite rings 115 that extend axially away from an upper surface 109 of a body portion of the flange 110 and toward the head gasket 116. The bite rings 115 are disposed at an intermediate position along the upper surface 109 of the flange 110 in between an outer radial edge of the flange 110 and a fire dam 122 portion of the cylinder liner 104. The bite rings 115 separate the sealing interface for the head gasket 116 between an inner land area 118 that is located radially inboard of the innermost bite ring, and an outer land area 120 located between the outermost bite ring and an outer radial edge of the flange 110. In the embodiment of FIG. 5, the bite rings 115 are concentric with one another and with the combustion cylinder 22. Additionally, each of the bite rings 115 have a similar cross-sectional shape. However, it will be appreciated that the spacing and/or cross-sectional geometry of at least one of the bite rings 115 may be different in various embodiments. For example, in at least one embodiment, the height of at least one bite ring 115 may be different from the remaining bite rings 115 (e.g., the outermost bite ring 115 may be taller than the innermost bite ring 115, etc.).

The position of the bite rings 115 along the upper surface 109 of the flange 110 may also be different in various embodiments. Additionally, it will be appreciated that a greater number of bite rings 115 may be utilized in alternative embodiments to further enhance the sealing performance of the head gasket 116.

As shown in FIG. 5, the head gasket 116 engages with the cylinder head 103 under compression load along each of the inner land area 118, the bite rings 115, and the outer land area 120. The compression between the cylinder head 103 and the cylinder block 16 causes the head gasket 116 to yield at the location of each of the bite rings 115 to thereby create a focused area of contact between the liner 104, the head gasket 116, and the cylinder head 103. This focused area of contact seals the passage between the cylinder head 103 and the cylinder block 16 and prevents leakage of hot combustion gasses from the cylinder 22 during engine operation.

As shown in FIG. 5, the liner 104 also includes a fire dam, shown as dam 122, extending axially away from the inner land area 118 and toward the cylinder head 103. The fire dam 122 restricts the flow passage between the liner 104 and the cylinder head 103 and helps reduce fluid pressure at, and combustion gas leakage through, the head gasket 116. For example, the leakage may be mitigated due to the reduced clearance between an upper surface of the dam 122 and a combustion facing surface of the cylinder head 103.

During engine operation, the innermost bite ring 115 and inner land 118 seal pressure from the combustion gases within the combustion cylinder 22. In the event that the compression of the head gasket 116 between the cylinder head 103 and the cylinder liner 104 is insufficient to prevent combustion gas leakage, the fluid from the cylinder 22 travels radially outwardly past the innermost bite ring 115. Arrow 124 indicates the direction of combustion gas flow past the inner land area 118 and the innermost bite ring 115. Under these conditions, the pressure of the combustion gas is substantially reduced as the fluid passes across the restriction at the innermost bite ring 115 and as the flow area increases along the radial flow path between the innermost and outermost bite rings 115. Among other benefits, the reduction in fluid pressure increases the integrity of the seal formed at the outermost bite ring 115 and reduces the likelihood of combustion gas leakage to the outer land area 120 of the head gasket 116. Moreover, because the bite rings 115 are disposed on the cylinder liner 104, the cylinder head joint arrangement 102 may be easily installed into an existing engine system by removing and replacing the original equipment cylinder liners.

Figure 6:
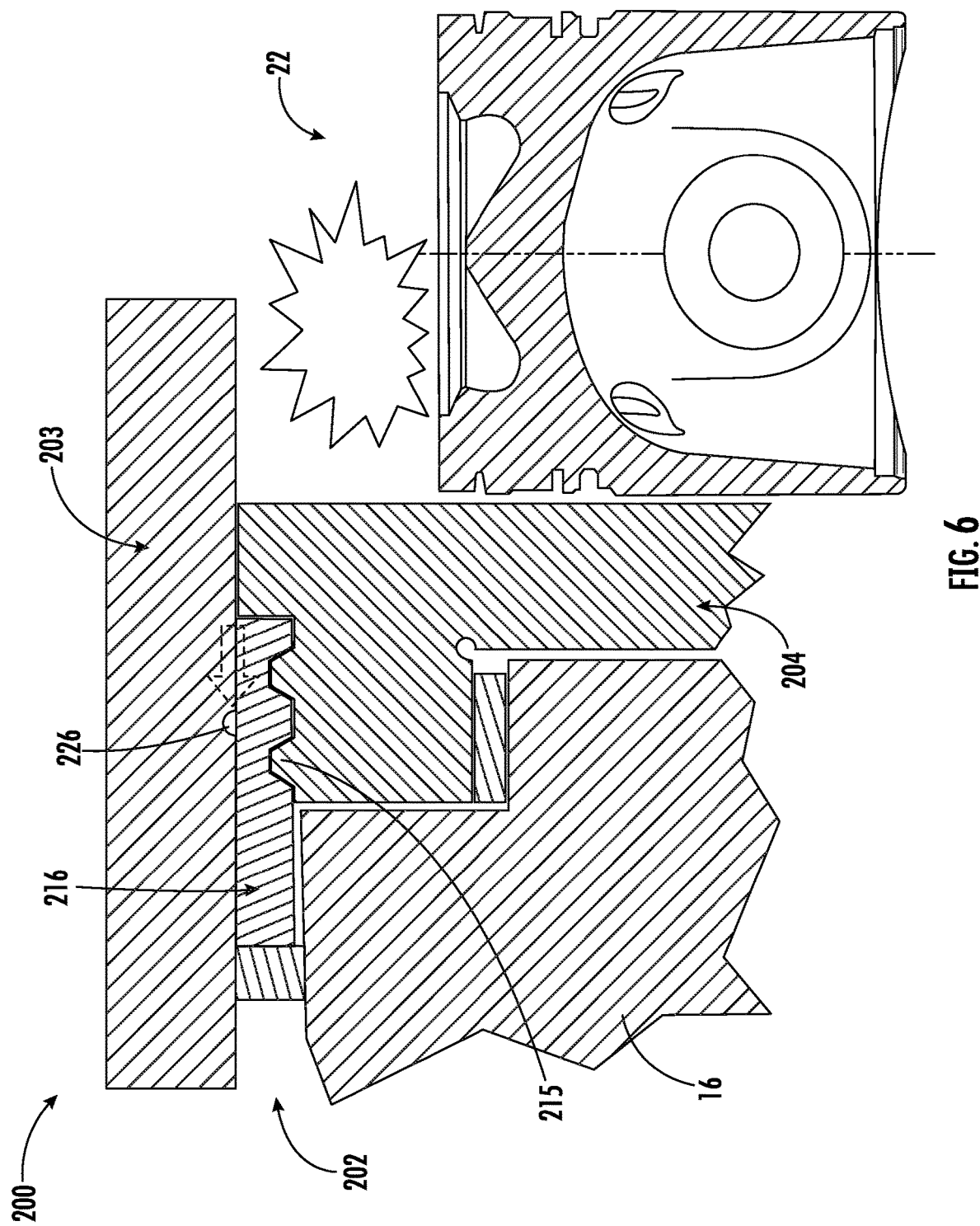
FIG. 6 is a side cross-sectional view of a cylinder head joint arrangement that includes a void in the cylinder head, according to an embodiment.

FIG. 6 shows another example cylinder head joint arrangement 202 for an internal combustion engine system 200. As with the engine system 100 described with reference to FIG. 5, the cylinder liner 204 of the engine system 200 in FIG. 6 includes a plurality of bite rings 215 to reduce combustion gas leakage through the cylinder head gasket 216. Additionally, the cylinder head 203 defines an expansion groove 226 configured to further increase the volume within the radial space between adjacent bite rings 215 to thereby further reduce the pressure of any leaked combustion gas. As shown in FIG. 6, the expansion groove 226 is disposed in a lower surface (e.g., combustion facing surface, etc.) of the cylinder head 203 and extends in a circumferential direction around the cylinder head and circumscribes the innermost bite ring 215. In the embodiment of FIG. 6, the expansion groove 226 is formed by a semicircular channel in the lower surface of the cylinder head 203 and is approximately centered in a radial direction between adjacent bite rings 215.

In other embodiments, the shape, size, and position of the expansion groove 226 may be different. Note that the position of the expansion groove 226 within the engine system 200 may also differ in various embodiments. For example, the expansion groove 226 may be formed in an upper surface of the head gasket 216 rather than the cylinder head 203, or in both the cylinder head 203 and the head gasket 216. Among other benefits, the use of an expansion groove 226 in the flow passage between the cylinder head 203 and the head gasket 216 provides a significantly larger volume for the leaked combustion gas to distribute before reaching the outermost bite ring 215, which has the effect of reducing the resistance on the gas flow and significantly reducing the pressure of the gas at the outermost bite ring 215.

Figure 7:
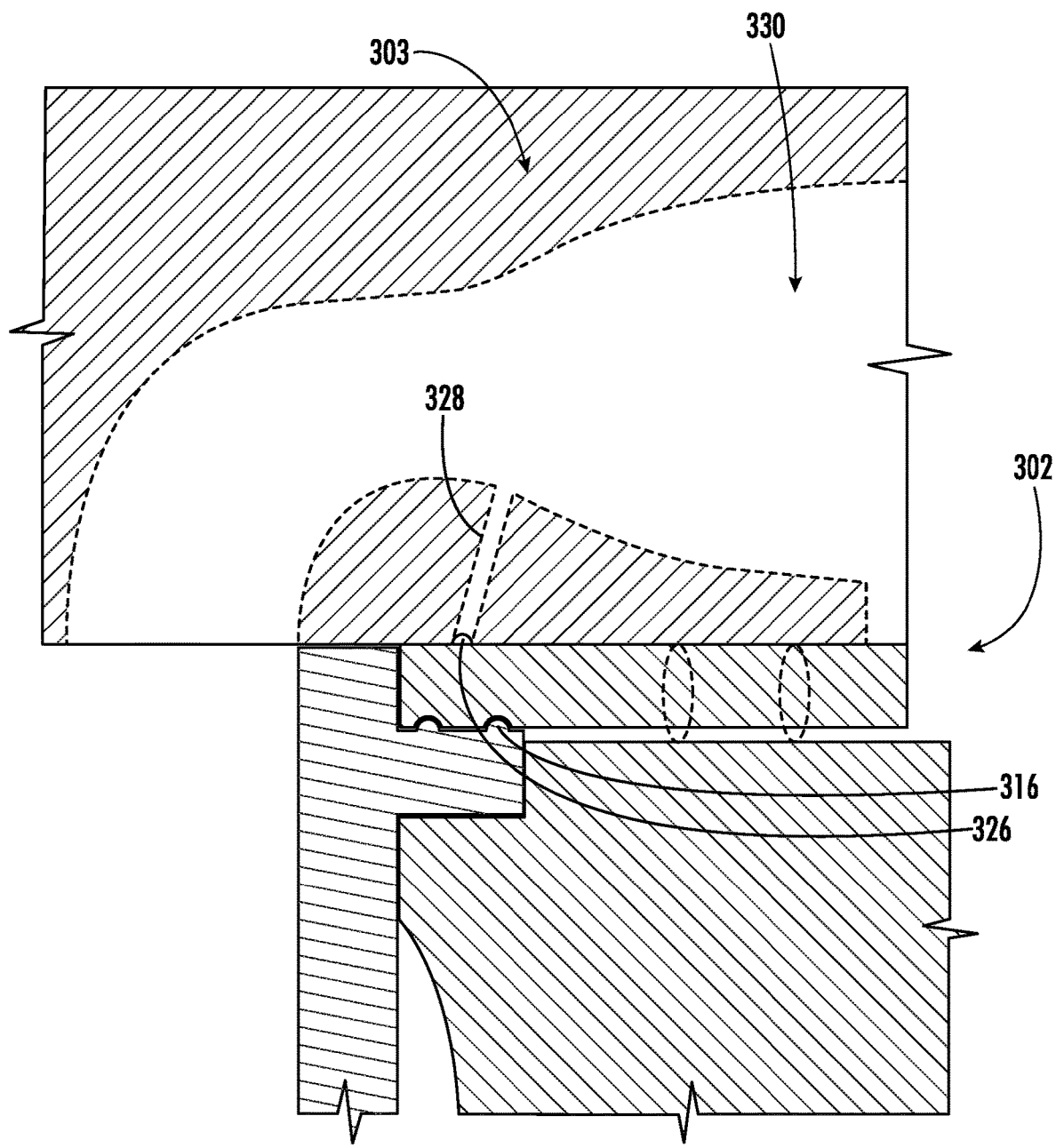
FIG. 7 is a side cross-sectional view of a cylinder head joint arrangement that includes a vented void in the cylinder head, according to an embodiment.

Further reductions in the leaked combustion gas pressure at the outermost bite ring can be achieved by venting the combustion gas from the expansion groove and away from the outermost bite ring. For example, FIG. 7 shows a cylinder head joint arrangement 302 in which the cylinder head 303 defines a vent passage 328 (e.g., channel, port, etc.) that extends between (and fluidly couples) (i) an expansion groove 326 in the lower surface of the cylinder head 303, and (ii) an exhaust port 330 in the cylinder head 303 that fluidly couples the combustion cylinder 22 with an environment surrounding the engine system. In another embodiment, the vent passage 328 may be positioned within the cylinder head 303 to direct leaked combustion gas toward an outside edge of the cylinder head 303 and into an environment surrounding the cylinder head 303. In this way, combustion gas entering the expansion groove 326 is directed in a circumferential direction toward the vent passage 328 and away from the outermost bite ring 316.

Figure 8:
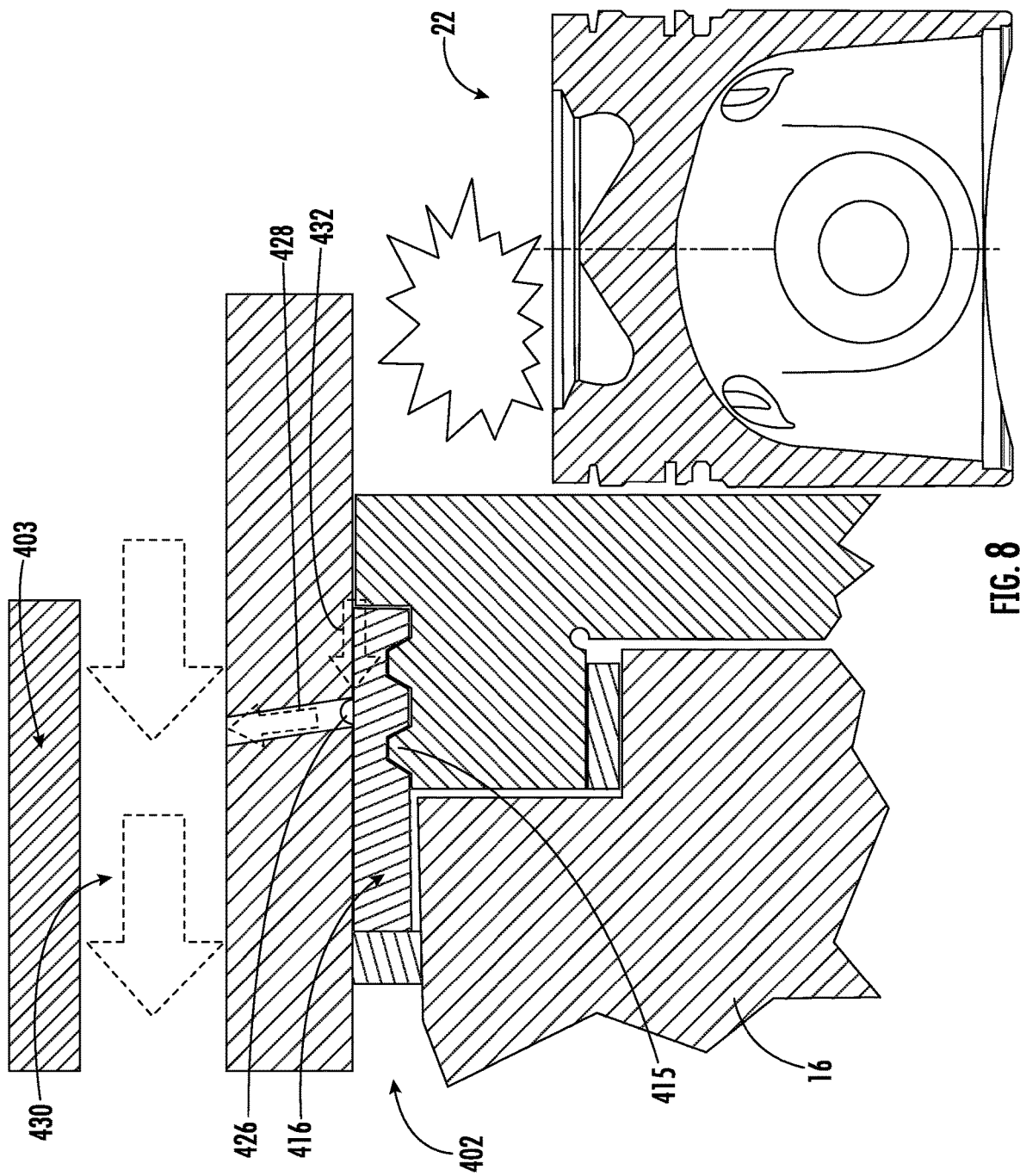
FIG. 8 is a side cross-sectional view of a cylinder head joint arrangement that includes a vented void in the cylinder head, according to another embodiment.

The configuration of the vent passage described with reference to FIG. 7 should not be considered limiting. Many alternatives and combinations are possible without departing from the inventive concepts described herein. For example, FIG. 8 shows another example embodiment of a cylinder joint arrangement 402 that also includes a vent passage 428 in the cylinder head 403. As shown in FIG. 8, the vent passage 428 extends upwardly from the expansion groove 426 to redirect leaked combustion gas from the space between the bite rings 415 and into a second vent passage 430 that passes through the cylinder head 403. In at least one embodiment, the second vent passage 430 is separate from an exhaust port. Arrows 432 indicate the direction of combustion gas leakage flow through the vent passage 428 and into the exhaust port 430. The compression seal formed between the head gasket 416 and the cylinder head 403 at the outermost bite ring 415 contains the reduced pressure combustion gas within the expansion groove 426, which channels combustion gas leakage from any location along the groove 426 into the vent passage 428.

Among other benefits, routing the leaked combustion gases through channels and/or passages may facilitate detection of leaks and monitoring of the severity of leaks through the head gasket. For example, in at least one embodiment, the cylinder joint arrangement and/or engine system may include a sensor configured to monitor combustion gas leakage through the groove 426, the first vent passage 428, and/or the second vent passage 430. The sensor(s) may include one or a combination of a pressure sensor configured to measure the pressure of combustion gases, a flow sensor configured to measure a rate of gas leakage, and/or a temperature sensor configured to measure a temperature of the gas in the channels and/or passages. The sensor(s) may be communicably coupled to an engine control unit and/or a separate combustion gas leakage monitoring system (e.g., circuit, controller, etc.) and may be configured to (i) detect combustion gas leakage, and (ii) indicate the severity (e.g., flow rate, pressure, temperature, etc.) of the combustion gas leakage. The sensor(s) may be configured to communicate the severity of the combustion gas leakage to the controller, which may be configured to take remedial action in response to the signals from the sensor(s). For example, the controller may be configured to send a control signal based on the severity of the combustion gas leakage and/or detection of leakage to a user interface (e.g., an indicator, dash mounted LED, etc.) to notify an operator that a leak is occurring. In another embodiment, the controller may be configured to take action to mitigate damage caused by the leaking combustion gases. For example, the controller may be configured to de-rate the engine (e.g., limit a maximum power, engine rotational speed, etc.), and/or limit a distance that the vehicle can travel in response to signals from the sensor(s). Among other benefits, the additional sensor(s) can provide an early indication of even minor leaks that would not be perceivable by vehicle operator and/or technician, and prevent damage that could ultimately lead to engine failure. The sensor(s) may also be used to identify potential non-compliance with local emissions regulations.

Figure 9:
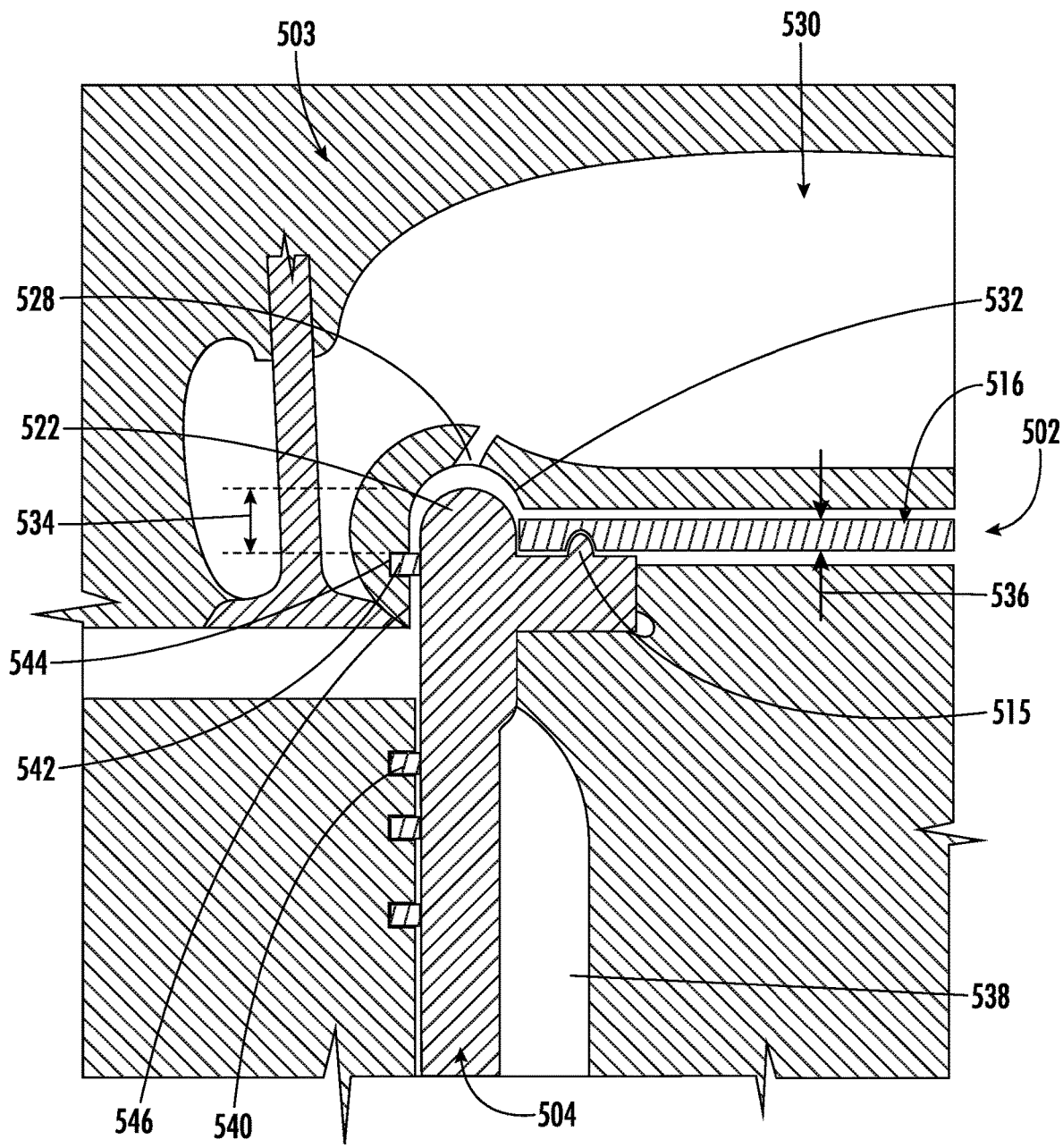
FIG. 9 is a side cross-sectional view of a cylinder head joint arrangement that includes a sealing ring, according to an embodiment.

The position of the vent passage along the joint interface may be modified in various embodiments. For example, FIG. 9 shows a cylinder head joint arrangement 502 in which the vent passage 528 is located upstream from the head gasket 516, in a position that is adjacent to the fire dam 522 for the cylinder liner 504 (e.g., above the fire dam 522, etc.). As shown in FIG. 9, the cylinder head 503 defines a recessed channel 532 that is radially aligned with the fire dam 522. The fire dam 522 extends axially toward the cylinder head 503 and is received at least partially within the recessed channel 532 such that the cylinder head 503 extends axially into the cylinder liner 504. The recessed channel 532 is contoured to match the cross-sectional profile of the fire dam 522. In the embodiment of FIG. 9, the recessed channel 532 has a semicircular cross-section. However, the cross-sectional shape of the recessed channel 532 may be different in various embodiments.

As shown in FIG. 9, a height 534 of the fire dam 522 portion of the cylinder liner 504 is greater than a thickness 536 of the cylinder head gasket 516. This difference in axial height provides space for a secondary sealing member within the cylinder head 503. As shown in FIG. 9, a lower surface (e.g., combustion face, etc.) of the cylinder head 503 extends axially into the bore of the cylinder liner 504 such that at least a portion of the cylinder head 503 is encompassed by (e.g., circumferentially surrounded by) the cylinder liner 504. Among other benefits, this structure provides additional axial clearance for a cooling jacket 538 that is disposed between the liner 504 and the cylinder block 16 and ensures that the uppermost axial piston ring 540 is positioned within a first portion of the liner 504 (e.g., the cooled portion of the liner 504) when the piston is located at a top dead center position within the combustion cylinder (as shown in FIG. 9). It will be appreciated that the exact height 534 of the fire dam 522 may be different in various embodiments.

The secondary sealing member is disposed between the combustion cylinder 22 and the head gasket 516 and is configured to reduce the fluid pressure at the head gasket 516 (e.g., at the location of the bite ring 515). As shown in FIG. 9, the secondary sealing member is a cylindrical sealing ring 542 that projects radially away (e.g., radially outwardly) from the cylinder head 503 toward the cylinder liner 504

(e.g., fire dam 522). In particular, the sealing ring 542 is disposed within a slot 544 along the inner wall 546 of the recessed channel 532. In at least one embodiment, the sealing ring 542 is a piston ring that engages the cylinder liner 504 along an inner surface of the fire dam 522. In the event that the contact pressure between the sealing ring 542 and the liner 504 is insufficient to prevent combustion gas leakage, the flow travels past the sealing ring 542 and axially into the passageway formed between the fire dam 522 and the recessed channel 532. Under these conditions, and due in part to the increase in flow area downstream of the sealing ring 542, the pressure of the combustion gas is substantially reduced as it moves across the sealing ring 542 and into the recessed channel 532. From the recessed channel 532, the leaked combustion gas is directed into the exhaust port 530 through the vent passage 528, which further reduces the pressure in the passageway between the fire dam 522 and the recessed channel 532. Among other benefits, this reduction in leaked combustion gas pressure increases the integrity of the seal formed between the head gasket 516 and the cylinder head 503 at the bite ring 515.

Figure 10:
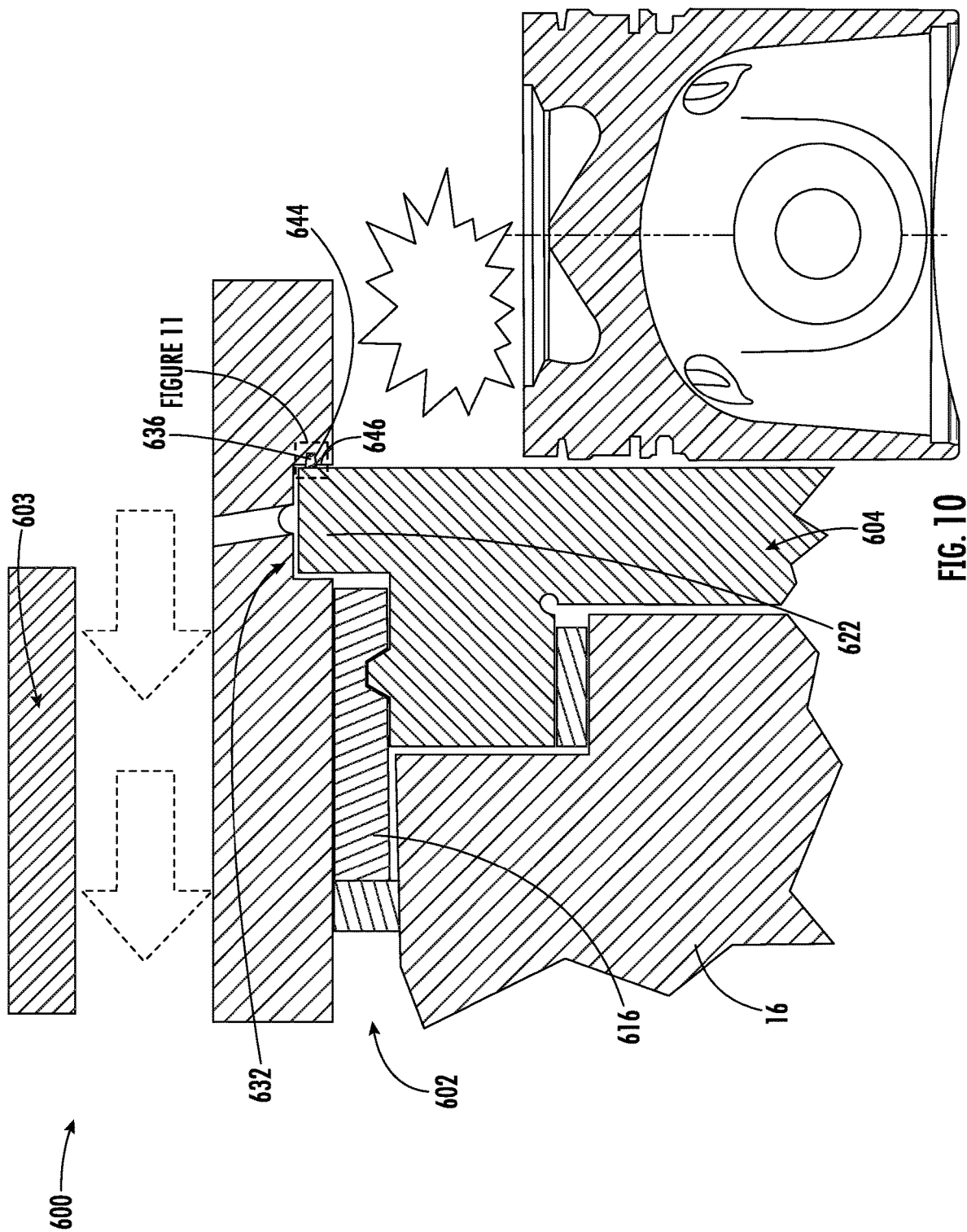
FIG. 10 is a side cross-sectional view of a cylinder head joint arrangement that includes a sealing ring, according to another embodiment.

The geometry of the recessed channel and fire dam may differ in various embodiments. For example, FIG. 10 shows another embodiment of a joint arrangement 602 of an internal combustion engine system 600 in which a cross-sectional shape of the recessed channel 632 and fire dam 622 is substantially rectangular instead of circular. Similar to the embodiment described with reference to FIG. 9, the cylinder head 603 shown in FIG. 10 includes a sealing ring 636 that is disposed within a slot 644 that extends along the inner radial surface 646 of the recessed channel 632.

Figure 11:
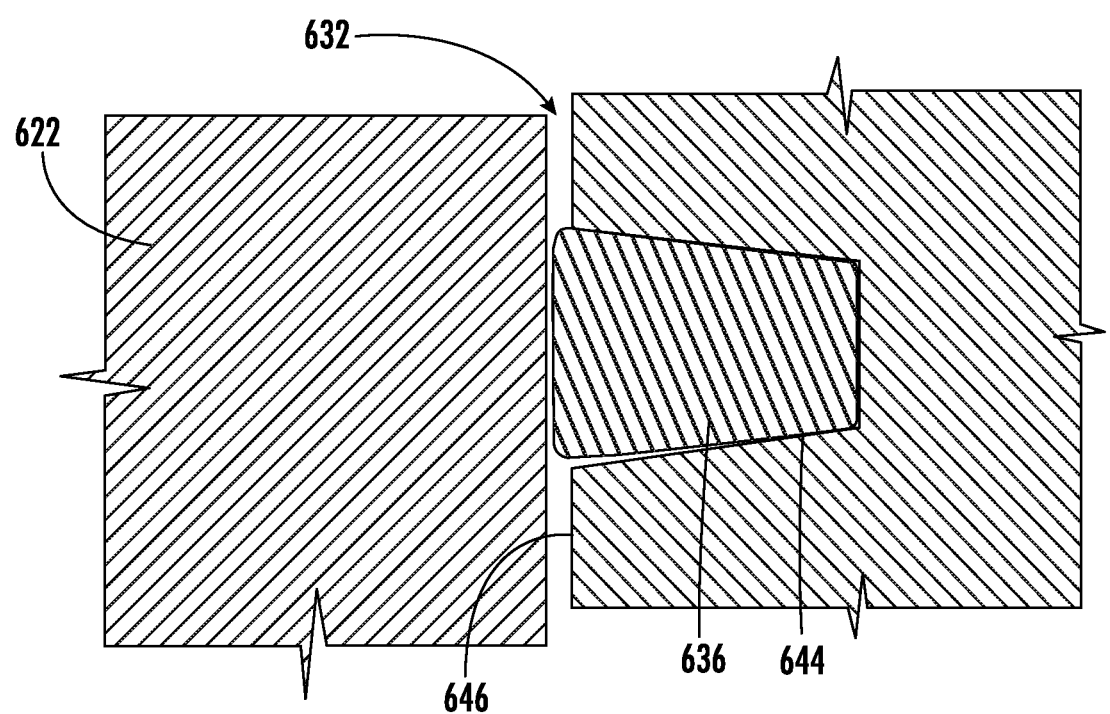
FIG. 11 is a side cross-sectional view of a sealing ring portion of the cylinder head gasket arrangement of FIG. 10.

FIG. 11 is a detail view of a portion of FIG. 10 near the interface between the sealing ring 636 and the cylinder liner 604. As shown, the sealing ring 636 engages the cylinder liner 604 in a radial sealing arrangement to substantially prevent combustion gas leakage and fluid pressure at the head gasket 616. In another embodiment, the cylinder head 603 may include a plurality of sealing rings 636 arranged axially along the inner radial surface 646 of the recessed channel 632 or at another location upstream of the head gasket 616 (e.g., along an outer radial surface of the recessed channel 632 opposite the inner radial surface 646, etc.). Note that the size and/or cross-sectional geometry of each sealing ring 636 may also be different in various embodiments.

Figure 12:
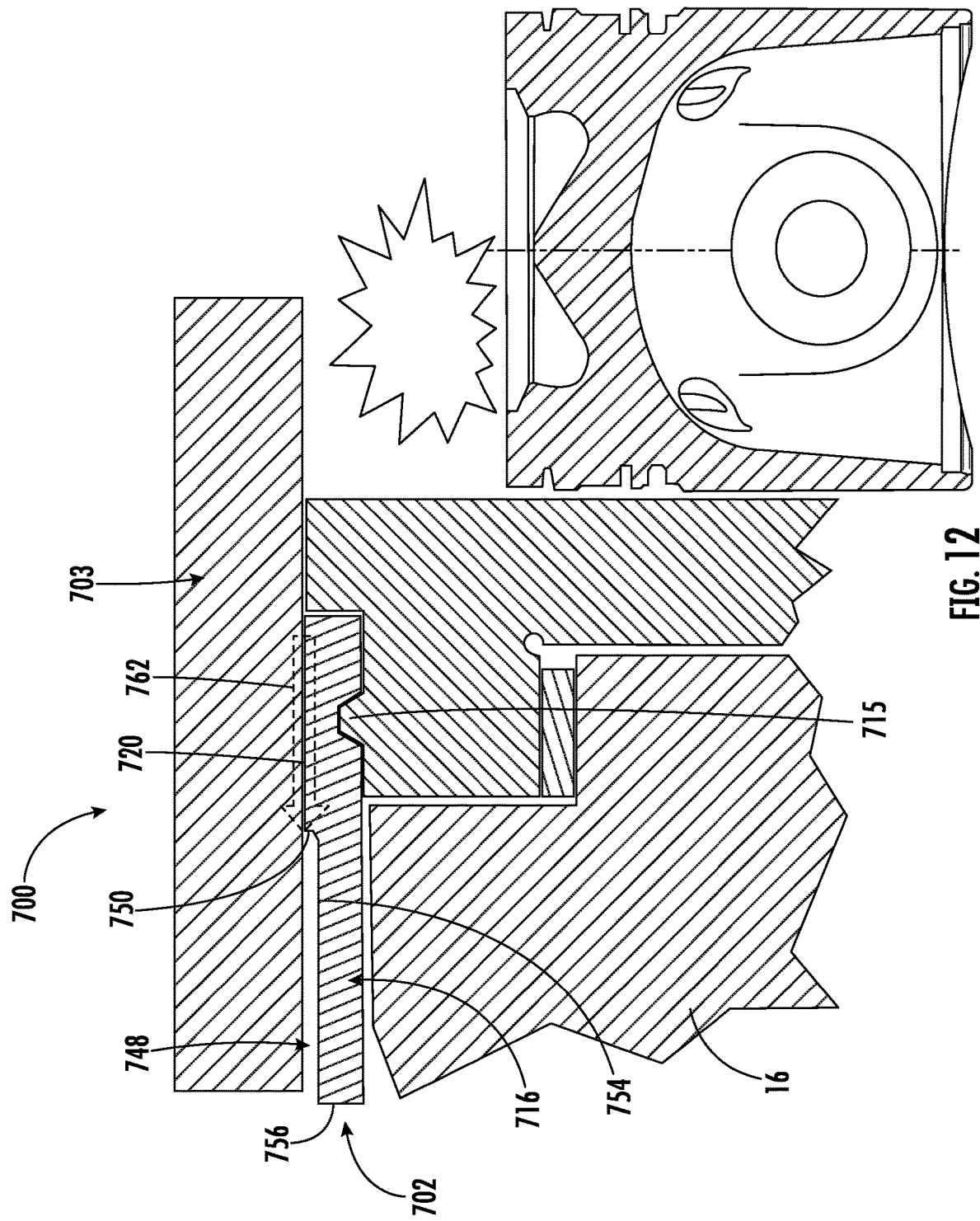
FIG. 12 is a side cross-sectional view of a cylinder head joint arrangement that includes a radial void and vent, according to an embodiment.
Figure 13:
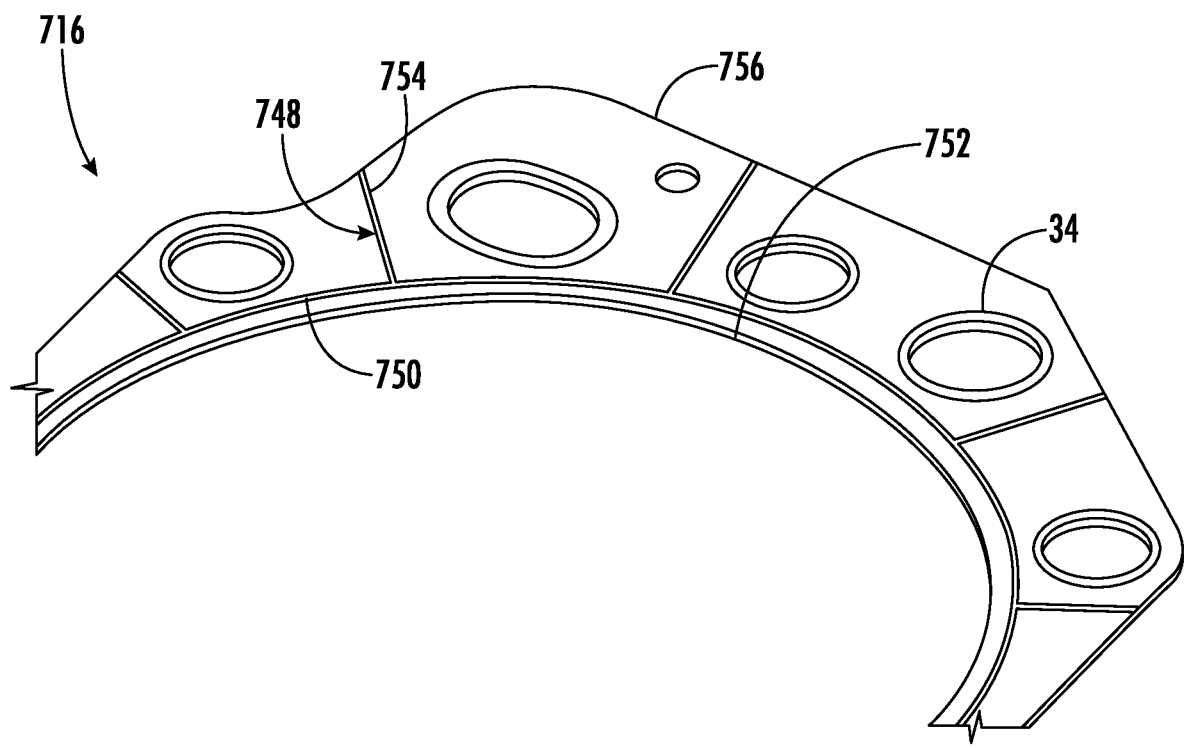
FIG. 13 is a partial perspective view of a head gasket portion of the cylinder head gasket arrangement of FIG. 12.

FIG. 12 shows a cross-sectional view of a cylinder head joint arrangement 702 of an internal combustion engine system 700, according to another example embodiment. The engine system 700 is similar to the engine system 100 described with reference to FIG. 5, but includes a head gasket 716 that is structured to vent combustion gas leakage directly to an environment surrounding the cylinder head 703 and away from any temperature and/or pressure sensitive components. FIG. 13 shows a partial perspective view of the head gasket 716 from the engine system 700 of FIG. 12. The head gasket 716 defines a plurality of flow directing grooves, shown as grooves 748, configured to direct the flow of exhaust gas leakage away from any sensitive components (e.g., such as the sealing grommets 34 used to prevent leakage of coolant and/or oil through the head gasket 716). As shown in FIG. 13, the grooves 748 are disposed on (e.g., defined in) an upper surface of the head gasket 716 that faces the cylinder head 12. The head gasket 716 defines a first groove 750 (e.g., circumferential groove, channel, etc.) that extends in a circumferential direction around the cylinder opening 752 and a second groove 754 (e.g., radial groove, lateral groove, channel, etc.) extending radially away from the first groove 750 to an outer edge 756 of the cylinder head gasket 716. In the embodiment of FIG. 13, the cylinder head gasket 716 defines a plurality of second grooves 754 that are positioned in between and spaced apart from the openings and/or sealing grommets 34 of the head gasket 716 to reduce the risk of damage from leaking combustion gases.

As shown in FIGS. 12 and 13, the first groove 750 is disposed radially outboard from the outer land area 720 of the head gasket 716. In the event that the compression between the cylinder head 12 and the head gasket 716 is insufficient to prevent combustion gas leakage, the combustion gas will be directed radially outwardly from the combustion cylinder 22. Arrow 762 indicates the direction of leaked combustion gas flow through the head gasket 716, past the bite ring 715 and into the first groove 750. The increase in flow area as the fluid enters the first groove 750 causes a reduction in fluid pressure, which helps to contain the leaked combustion gases within the first groove 750. The first groove 750 redirects the flow to the nearest one of the second grooves 754, which duct the leaked combustion gasses safely past sensitive components and to atmosphere at the outer edge of the head gasket 716. Among other benefits, this design can be easily installed as a retrofit component on existing engine system designs, without requiring machining or modifications to the cylinder head 12 or cylinder block 16. In the event that the compression seal at the bite ring 715 fails, high temperature combustion gasses are safely directed to atmosphere, and operation of the engine system can continue while reducing the risk of permanent damage to critical engine components. Additionally, the engine system may further include at least one sensor positioned at one of the first groove 750 and/or second groove 754 to facilitate detection and mitigation of combustion gas leakage, as described in more detail above.

Figure 14:
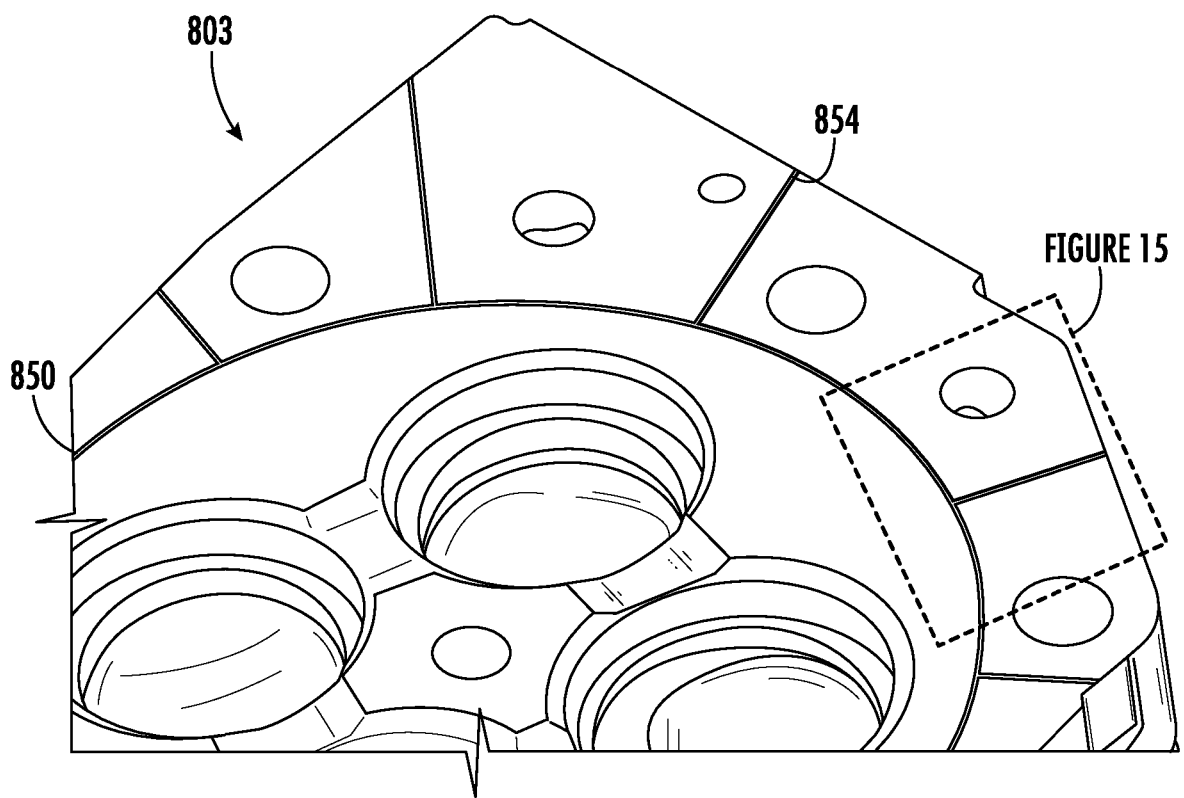
FIG. 14 is a perspective view of a cylinder head, according to an embodiment.
Figure 15:
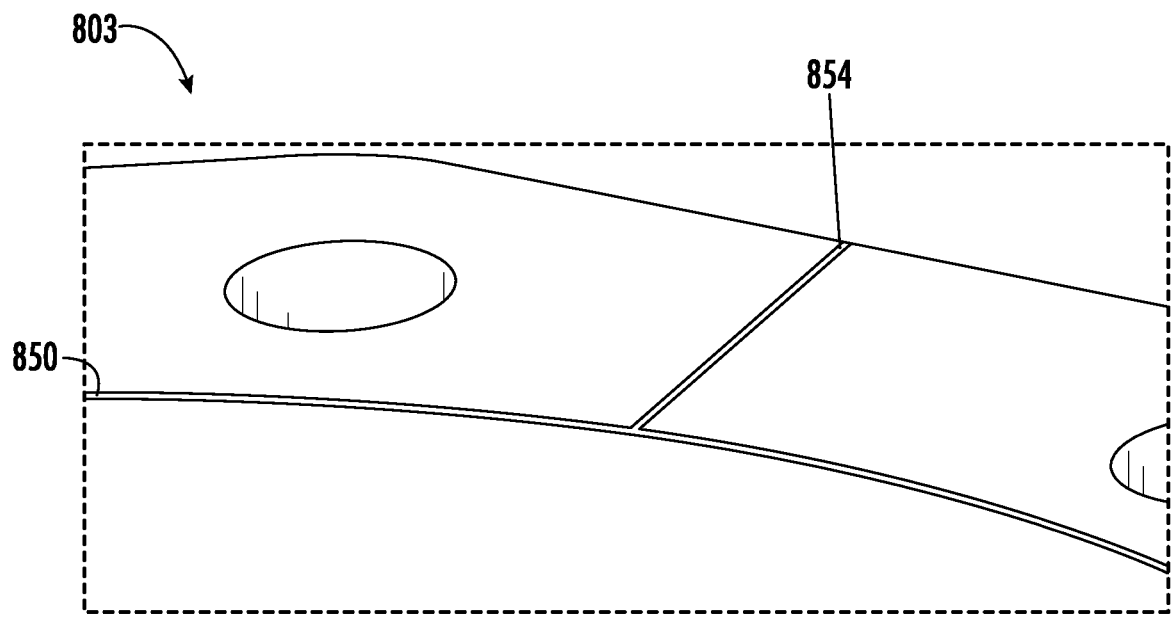
FIG. 15 is a reproduction of FIG. 14 in a grooved portion of the cylinder head.

It will be appreciated that the shape, number, and arrangement of grooves may differ in various embodiments. For example, FIGS. 14-15 show an example embodiment in which the first groove 850 and the plurality of second grooves 854 are disposed on a lower surface (e.g., gasket facing surface, combustion facing surface, etc.) of the cylinder head 803 instead of, or in addition to, the head gasket. Among other benefits, the groove geometry shown in FIGS. 14-15 can be machined onto the lower surface of an existing cylinder head or provided as part of an aftermarket cylinder head that can be retrofitted onto an existing cylinder block 16 without modifying the design of the cylinder block 16 or head gasket.

Figure 16:
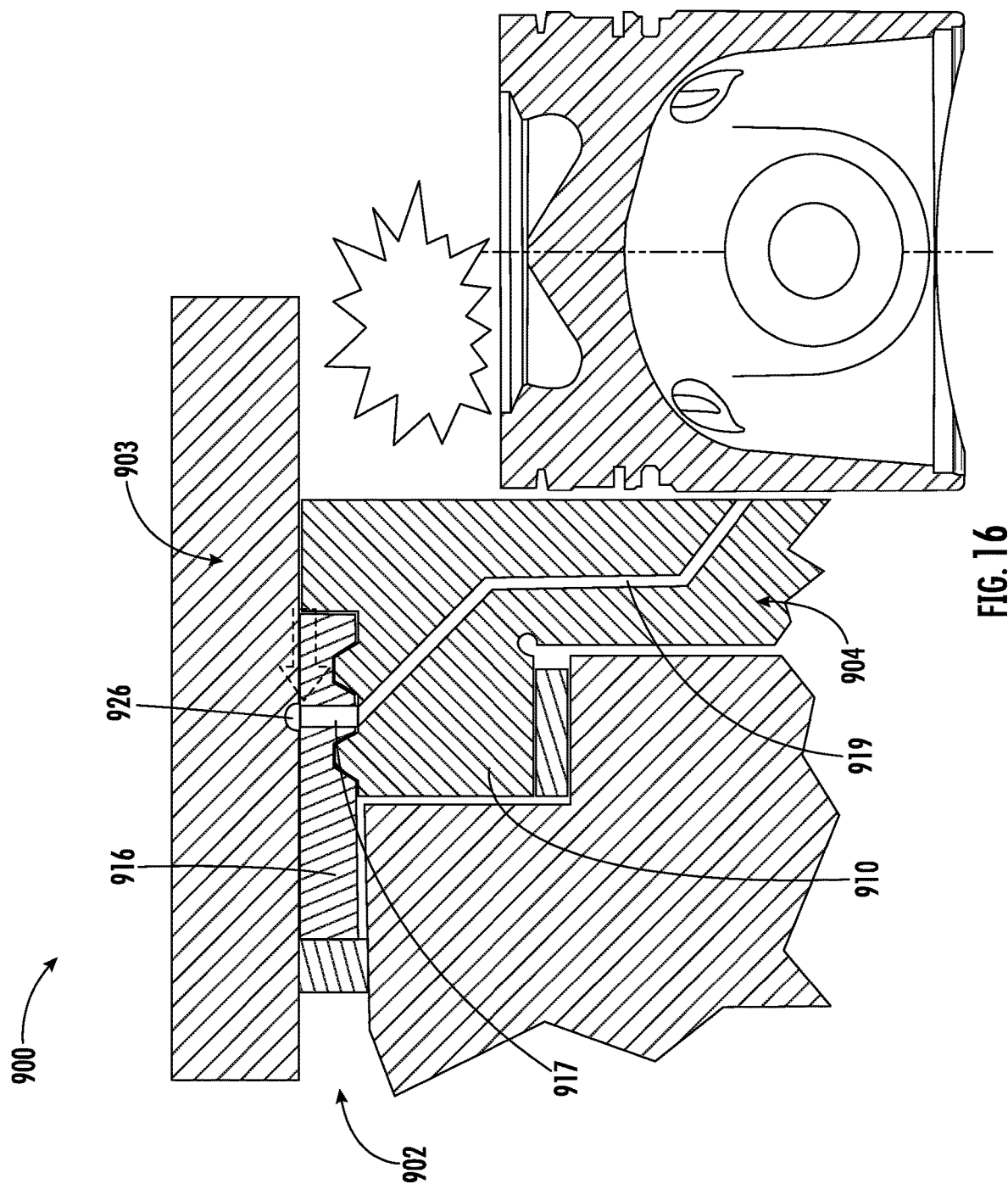
FIG. 16 is a side cross-sectional view of a cylinder head joint arrangement that includes a void in the cylinder head and a liner passage, according to an embodiment.

FIG. 16 shows a cross-sectional view of a cylinder head joint arrangement 902 of an internal combustion engine system 900, according to another example embodiment. The engine system 900 is similar to the engine system 200 described with reference to FIG. 6, but includes a modified head gasket 916 and liner 904 that are structured to vent combustion gas leakage away from the cylinder head 903 and into a crankcase area of the engine system 900. The cylinder head 903 includes a groove 926 that is disposed at an intermediate position between the inner and outer bite rings of the liner 904. As described above, the volume of the groove 926 traps any leaking combustion gases, which has the effect of reducing the resistance on the gas flow and significantly reducing the pressure of the gas at the outer bite ring. As shown in FIG. 16, the head gasket 916 includes at least one passage 917 (e.g., through-hole opening, etc.) that connects the groove 926 in the cylinder head 903 to at least one channel 919 in the liner 904. The passage 917 is aligned with the groove 926 and directs any leaked combustion gases from the groove 926 to an upper side of the liner flange 910, in between the bite rings on the liner flange 910. The channel 919 directs any leaked combustion gases from the passage 917 through the liner 904 and back into the cylinder bore. In particular, the channel 919 directs the leaked combustion gases into a low pressure region of the cylinder bore, in space below the piston (low pressure relative to the combustion side of the piston). For example, an outlet of the channel 919 may be positioned below the highest piston ring, below the piston ring pack, below the piston skirt, and/or another reduced pressure location relative to the combustion side of the piston. The leaked combustion gas re-entering the cylinder bore from the channel 919 follows the same flow path as combustion gas blow-by (e.g., gas leakage past the piston ring pack, etc.) leaking past the piston. For example, the leaked combustion gases may be directed into the crankcase area of the engine and be exhausted to the atmosphere via a crankcase breather. In other embodiments, the leaked combustion gases may be filtered and recirculated back through the engine combustion process via a closed crankcase ventilation system.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given value) are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An internal combustion engine system, comprising:
   a cylinder block defining a combustion cylinder;
   a bite ring that circumscribes the combustion cylinder;
   a cylinder head coupled to the cylinder block and covering the combustion cylinder; and
   a head gasket disposed between the cylinder head and the cylinder block, the head gasket being structured to engage with the bite ring, at least one of the cylinder head or the head gasket including:
      a first groove defining an open channel that is spaced radially apart from the bite ring and any other bite rings that circumscribe the combustion cylinder; and
      a second groove extending radially away from the first groove to an outer edge of the head gasket.

2. The internal combustion engine system of claim 1, further comprising a liner disposed at least partially within the combustion cylinder and comprising a flange extending radially away from the combustion cylinder, wherein the bite ring is disposed on the flange.

3. The internal combustion engine system of claim 1, wherein the second groove is one of a plurality of second grooves that extend radially away from the first groove to the outer edge of the head gasket.

4. The internal combustion engine system of claim 1, wherein the first groove and the second groove are disposed on an upper surface of the head gasket that faces the cylinder head.

5. The internal combustion engine system of claim 1, wherein the bite ring is one of a plurality of bite rings that circumscribe the combustion cylinder, wherein the first groove is disposed radially outside of an outer land area of the head gasket that separates an outermost bite ring of the plurality of bite rings from the first groove.

6. The internal combustion engine system of claim 1, wherein the head gasket defines a plurality of openings, wherein the second groove is one of a plurality of second grooves that extend radially from the first groove, the plurality of second grooves positioned in between and spaced apart from the plurality of openings.

7. The internal combustion engine system of claim 1, further comprising a liner disposed at least partially within the combustion cylinder, wherein the liner comprises a dam extending axially outwardly from the combustion cylinder, wherein a height of the dam is greater than a thickness of the head gasket.

8. The internal combustion engine system of claim 1, further comprising a liner disposed at least partially within the combustion cylinder, further comprising a piston, wherein an uppermost axial piston ring of the piston is positioned within a cooled portion of the liner when the piston is located at a top dead center position within the combustion cylinder.

9. The internal combustion engine system of claim 1, wherein the first groove and the second groove are formed as depressions in the head gasket.

10. The internal combustion engine system of claim 1, wherein at least one of the first groove or the second groove is disposed in a gasket facing surface of the cylinder head.

* * * * *